(12) United States Patent
Harris

(10) Patent No.: US 8,047,985 B2
(45) Date of Patent: Nov. 1, 2011

(54) COMPACT CONFOCAL ENDOSCOPE AND ENDOMICROSCOPE METHOD AND APPARATUS

(75) Inventor: Martin Russell Harris, Windsor (AU)

(73) Assignee: Optiscan Pty Ltd, Victoria (AU)

( * ) Notice: Subject to any disclaimer, the term of this patent is extended or adjusted under 35 U.S.C. 154(b) by 1805 days.

(21) Appl. No.: 11/142,449

(22) Filed: Jun. 2, 2005

(65) Prior Publication Data

US 2005/0228229 A1 Oct. 13, 2005

Related U.S. Application Data

(63) Continuation of application No. 09/382,457, filed on Aug. 25, 1999, now abandoned.

(30) Foreign Application Priority Data

Aug. 27, 1998 (AU) ........................................ PP5482

(51) Int. Cl.
*A61B 1/04* (2006.01)
*G02B 26/08* (2006.01)
*G02B 26/10* (2006.01)
*G02B 26/12* (2006.01)
(52) U.S. Cl. ..................... 600/108; 359/205.1
(58) Field of Classification Search ............... 250/227.2, 250/227.26, 227.27; 348/197, 199; 359/202.1, 359/203.41, 205.1; 600/101, 108
See application file for complete search history.

(56) References Cited

U.S. PATENT DOCUMENTS

| | | | | |
|---|---|---|---|---|
| 5,078,482 A | * | 1/1992 | Feldman et al. | 359/371 |
| 5,120,953 A | * | 6/1992 | Harris | 250/227.2 |
| 5,701,197 A | | 12/1997 | Yano | |
| 5,701,198 A | | 12/1997 | Schoppe | |
| 5,751,417 A | | 5/1998 | Uhl | |
| 5,847,400 A | * | 12/1998 | Kain et al. | 250/458.1 |
| 5,926,592 A | | 7/1999 | Harris et al. | |
| 6,038,067 A | * | 3/2000 | George | 359/368 |
| 6,108,090 A | * | 8/2000 | Ishihara | 356/601 |
| 6,108,127 A | * | 8/2000 | Atkinson | 359/389 |
| 6,122,098 A | * | 9/2000 | Kask et al. | 359/368 |
| 6,510,001 B1 | | 1/2003 | Engelhardt et al. | |
| 7,252,634 B2 | * | 8/2007 | Mizumo | 600/160 |

FOREIGN PATENT DOCUMENTS

DE 199 06 757 12/1999

* cited by examiner

*Primary Examiner* — Philip Smith
(74) *Attorney, Agent, or Firm* — Stites & Harbison PLLC; Douglas E. Jackson

(57) ABSTRACT

The present invention provides a confocal endoscope, microscope or endomicroscope including a light source of coherent light for illuminating a sample, a beam splitter and light receiving means, wherein an incident beam of light from the light source is directed onto the beam splitter and hence onto the sample, and light returning from the sample and incident on the beam splitter is deviated or displaced by the beam splitter by a small angle or distance relative to the incident beam, and received by the light receiving means located to receive the returning light and near the light source. The invention also a method for performing confocal endoscopy or microscopy including illuminating a sample by means of an incident or excitatory beam of coherent light, and deviating or displacing light returning from the sample by a small angle or distance relative to the incident beam.

33 Claims, 4 Drawing Sheets

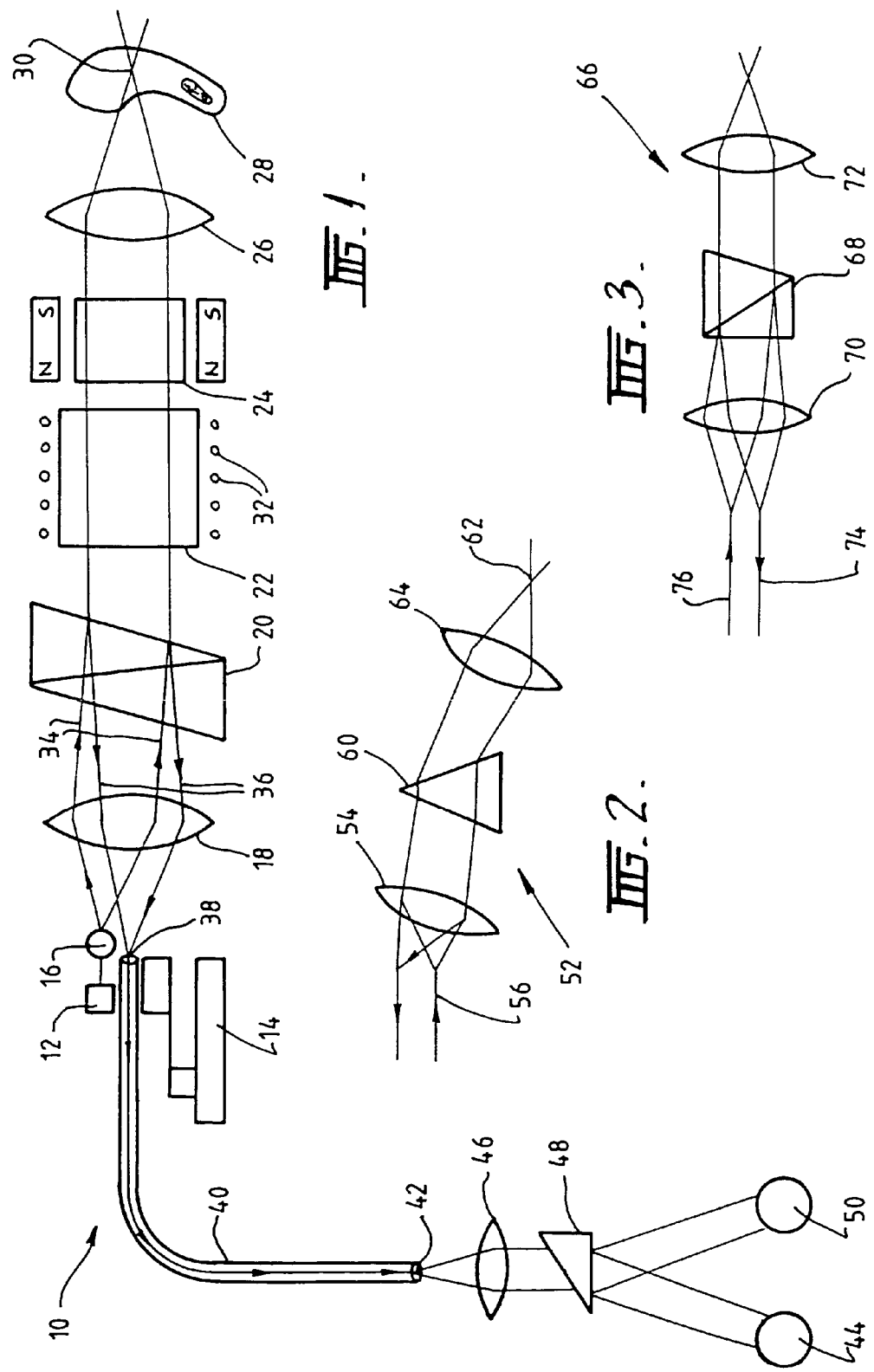

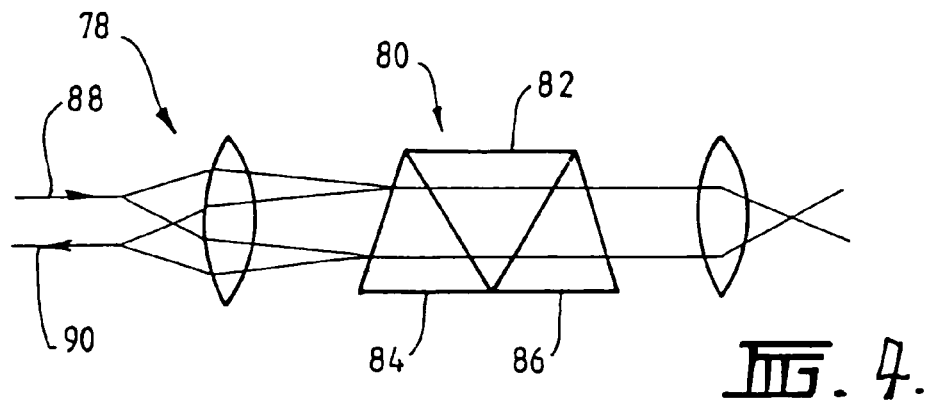
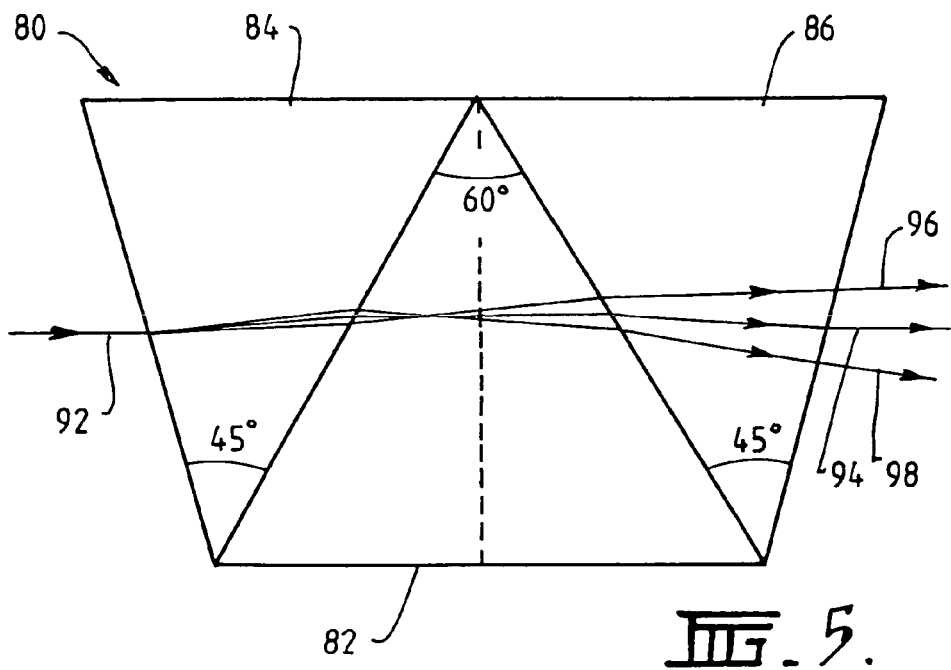
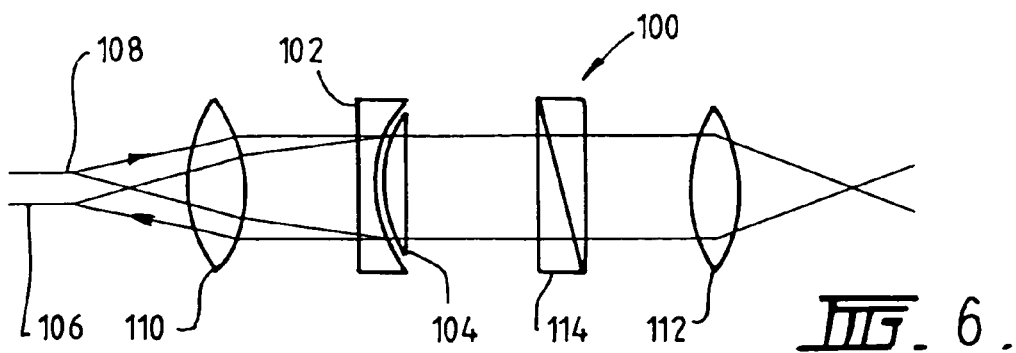

COMPACT CONFOCAL ENDOSCOPE AND ENDOMICROSCOPE METHOD AND APPARATUS

This application is a continuation of application Ser. No. 09/382,457, filed Aug. 25, 1999 now abandoned.

The present invention relates to compact confocal endoscopes and microscopes (including endomicroscopes), of particular but by no means exclusive application in the internal examination of the human body.

Existing confocal endoscopes employ beam splitting apparatus comprising partially mirrored surfaces or compound prisms. Such apparatus are both relatively bulky and designed to function efficiently only when the two exit beams diverge at a relatively high angle (which is often approximately 90°). Conventional beam splitters are generally 45° cubes or pellicles or are near orthogonal to the optic axis (as in the F900e) to eliminate polarization state noise.

These configurations, however, render a beam splitting head bulky, as suitable photoreceptors or light conduits must be located almost perpendicular to the light source and/or incident light beam. The resulting beam splitter may not, therefore, be deployed in particularly narrow apertures or other sites with restricted access, and nor may it be located on an endoscope head. To do so would increase the space required around the endoscope head, limiting the range of locations in which the endoscope could be deployed. Further, this would increase the mass of such an endoscope head, rendering it unwieldy for some applications. Additionally, beam splitters of this type—with such highly divergent outgoing beams—cannot be readily used where the photo emitter (be it a laser, optical fiber or otherwise) is to be moved in order to scan the sample. Clearly the light receiving means (which may be a pinhole, optical fiber or some form of photodetector) must be moved in such applications in synchrony with the photo emitter. However, accurately maintaining such registration where existing beam splitters are employed is impractical, owing to the separation of source and exit beams (and hence or emitter and receiving means).

It is an object of the present invention, therefore, to provide a confocal endoscope beam splitting method and apparatus that at least partially overcomes one or more of the above disadvantages of existing devices.

Accordingly, the present invention provides a confocal endoscope or microscope including:
- a light source of coherent light for illuminating a sample;
- a beam splitter; and
- light receiving means, wherein an incident beam of light from said light source is directed onto said beam splitter and hence onto said sample, and light returning from said sample and incident on said beam splitter is deviated or displaced by said beam splitter by a small angle or distance relative to said incident beam, and received by said light receiving means located to receive said returning light and near said light source.

The beam splitter may be provided by any suitable means, including single or compound prism(s) and/or lens(es). It should be noted that the light returning from the sample may include both fluorescent and reflected light; some beam splitters are envisaged (as will be detailed below) that will provide suitable deviation of the fluorescent light, while others are envisaged that will provide suitable deviation of the reflected light, or of both fluorescent and reflected light. It should also be noted that the light received by the light receiving means will generally be only a portion of the total returning light from the sample. Further, references to an "endoscope or microscope" should be understood to include reference to an endomicroscope.

In one embodiment the light source comprises a mirror located in the path of the returning light for directing light towards the sample, wherein the mirror has a smaller solid angle than the returning light to only partially occlude reception of the returning light by the light receiving means. Thus, in this embodiment the beam splitter is also provided by the mirror, which allows some of the returning to continue to the light receiving means. Preferably the mirror and the light source are provided on a single piece of silicon and the mirror comprises an etched mirror surface of the silicon.

Preferably the endoscope or microscope includes an optical head and said light source is located in or on said head.

Preferably said endoscope or microscope includes heating means for maintaining said head at a temperature substantially equal to that of said sample.

This temperature will, for human samples in vivo, human body temperature. This is desirable for patient comfort as well as for the stability of operation of the head components.

Preferably said light source and said light receiving means are on a single mounting means.

Preferably said beam splitter is mounted on said mounting means.

Preferably said mounting means is moveable for scanning said light source.

Thus, in one embodiment the light source, light receiving means and beam splitter are all mounted on the mounting, which is moveable for scanning the light source over the sample.

Preferably said mounting means includes a reed, and more preferably said mounting means is an electromagnetically vibrated reed.

Preferably said light source and said light receiving means are adjacent or touching.

Preferably said light source is an optical fiber tip.

Alternatively said light source is a laser, and more preferably a blue light laser.

Preferably said beam splitter includes a plurality of prisms and/or lenses.

Preferably said plurality of prisms and/or lenses provide minimal net deviation or translation, so that said coherent light or light reflected from said sample emerges from said plurality of prisms and/or lenses substantially parallel to and optically coaxial with its path immediately before impinging said plurality of prisms and/or lenses.

Thus, the plurality of prisms and/or lenses acts as a "direct vision" spectroscope.

Preferably said plurality of prisms and/or lenses is arranged to focus confocal return stokes fluorescence to form a line, said line forming a spectrum in which shorter wavelength fluorescence is located towards a first end of said line closer to said light source, while longer wavelength fluorescence is located towards a second end further from said light source.

Preferably said endoscope or microscope further includes means to allow light on either side of a spectral line in said returning light to be included with light from said spectral line when said returning light impinges on said light receiving means.

Preferably said means is controlled by a mechanism which occludes light which is more distant in wavelength than a desired amount from said spectral line, to allow control of depth of field isolation.

Preferably the endoscope or microscope includes optical elements to divert chosen wavelength portions of said spectral line (and optionally light close in wavelength to said spectral line) to one or more photodetectors to give different spectral channels for imaging.

Preferably the endoscope or microscope includes at least one optical waveguide channel to convey said returning light to said photodetectors.

Preferably the endoscope or microscope includes a laser and an optical waveguide to convey light from said laser to said light source.

Preferably the endoscope or microscope includes a first optic waveguide to convey light to said specimen and at least one second optic waveguide channel to convey said returning light to said photodetectors, and said beam splitter is disposed in said head between said first and second optic waveguides.

Alternatively the endoscope or microscope includes a return fiber and said beam splitter is located between a light exit area of said return fiber and said photodetectors, to provide spectral separation after said returning light exits said fiber.

Preferably the endoscope or microscope includes an aperture slit moveable in front of said photodetectors simultaneously with said scanning to compensate for changes in beam splitter deviation.

Preferably said lenses include at least one apochromatic lens.

Preferably said prisms and/or lenses include an SF 11 or SF 59 prism.

Such a combination is reasonably achromatic and non-deviating for the 515 nm-650 nm range, and which has substantial dispersion for the blue.

According to the present invention there is also provided a method for performing confocal endoscopy or microscopy including:
  illuminating a sample by means of an incident or excitatory beam of coherent light; and
  deviating or displacing light returning from said sample by a small angle or distance relative to said incident beam.

Preferably said method includes receiving or detecting said returning light at a point close to a source of said incident or excitatory beam.

Preferably said deviating or displacing of said light returning from said sample is effected by means of a beam splitter.

The present invention also provides a confocal endoscope or microscope including:
  a light source of coherent light for illuminating a sample;
  a beam splitter; and
  light receiving means, wherein an incident beam of light from said light source is directed onto said beam splitter and hence onto said sample, and light returning from said sample and incident on said beam splitter is deviated by said beam splitter by a small angle relative to said incident beam, and received by said light receiving means located to receive said returning light and near said light source, and said beam splitter includes polarization rotating means and deviation means to separate light of different polarizations, and operates by optically rotating said coherent light and said returning light.

Preferably the polarization rotating means is based on optical rotary dispersion and includes a chiral medium to optically rotate said coherent light and said returning light.

Alternatively the polarization rotation means includes a Faraday effect material, said material having simultaneously magnetic lines of force in the same direction as the propagation direction of said light, whereby the E vector of said coherent light is rotated as it passes through said material.

Alternatively the polarization rotation means includes phase plates or retardation elements, of a material whose structure is anisotropic at a molecular or crystalline level.

Alternatively the polarization rotation means includes liquid crystals.

Preferably said liquid crystals are optically active and/or birefringent.

Preferably said liquid crystals are cholesteric liquid crystals.

In one preferred embodiment said optical rotation is provided by intrinsic polarization properties of the sample or of any intermediate optical medium.

Thus, as many biological materials exhibit birefringent properties and or produce optical rotation, it is possible to use this property in the present invention.

The invention also provides a method for maintaining registration in a confocal endoscope or microscope including a light source and a light receiving means, including:
  splitting light returned from a sample with a small angle deviation beam splitter;
  employing said light source and said light receiving means located on a single moveable mounting means;
  moving said mounting means to scan said light source and thereby said sample.

Preferably said beam splitter includes a plurality of prisms and/or lenses.

Preferably the method includes moving said beam splitter with said light source and said light receiving means.

Preferably said plurality of prisms and/or lenses provide minimal net deviation.

Preferably said moving of said mounting means comprises vibrating said mounting means.

Preferably said mounting means is a reed.

Preferably said mounting means is an electromagnetically vibrated reed.

The present invention also provides a method for performing confocal endoscopy or microscopy including:
  illuminating a sample by means of an incident or excitatory beam of coherent light and thereby inducing a broader beam of returning light; and
  detecting a portion of the returning light adjacent to or near the incident beam.

Preferably the method includes directing the incident light towards the sample by means of a mirror located in the path of the returning light, wherein the mirror has a smaller solid angle than the returning light to only partially occlude reception of the returning light. Preferably the mirror and the source of the incident light are provided on a single piece of silicon and the mirror comprises an etched mirror surface of the silicon.

In order that the present invention may be more clearly ascertained, preferred embodiments will now be described, by way of example, with reference to the accompanying drawing in which:

FIG. 1 is a schematic view of a confocal endoscope according to a preferred embodiment of the present invention;

FIG. 2 is a schematic view of the optical configuration of an endoscope head according to another preferred embodiment of the present invention;

FIG. 3 is a schematic view of the optical configuration of an endoscope head according to another preferred embodiment of the present invention;

FIG. 4 is a schematic view of the optical configuration of an endoscope head according to another preferred embodiment of the present invention;

FIG. 5 is a ray trace of the prism combination of FIG. 4;

FIG. 6 is a schematic view of the optical configuration of an endoscope head according to another preferred embodiment of the present invention;

Figure 10:
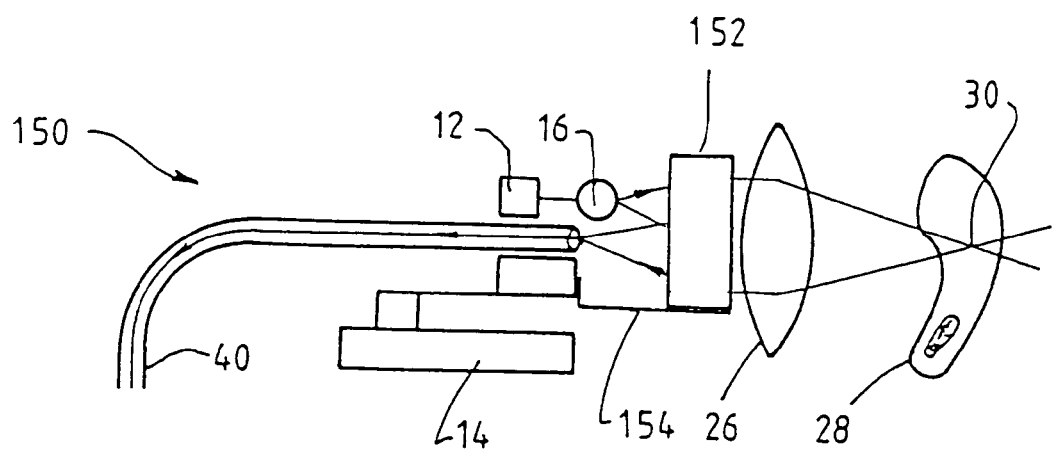
Figure 11:
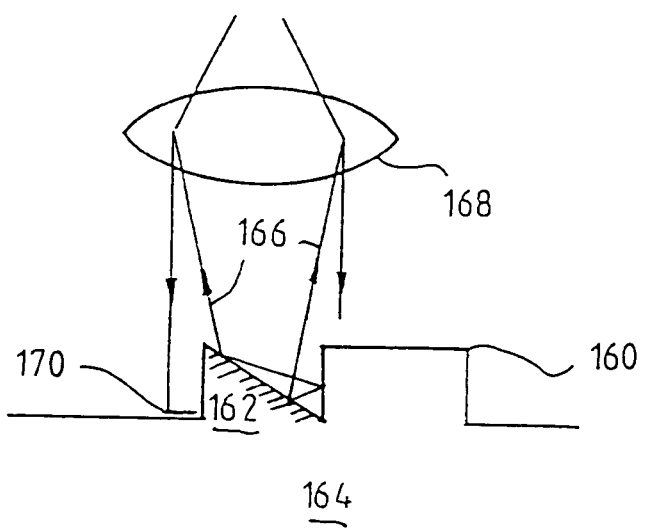

FIG. 10 is schematic view of the head of a confocal endoscope according to a further preferred embodiment of the present invention, in which the light source, optic fiber tip and beam splitter are mounted on the same scanning mechanism; and FIG. 11 is a schematic view of a confocal endoscope according to a further preferred embodiment of the present invention, in which the beam splitter comprises a single piece of silicon with an etched mirror surface.

A confocal endoscope according to a preferred embodiment of the present invention is illustrated schematically at 10 in FIG. 1. The Endoscope 10 includes a miniature laser diode 12, a scanning mechanism 14, an astigmatism corrector 16, a lens 18 and a Nomarski type polarization separation prism, often referred to as a Spatial Walkoff Filter (SWF) 20.

A laser beam is generated by the laser diode 12, which is mounted on the scanning mechanism 14. The divergent laser beam passes through the astigmatism corrector 16 to lens 18 which roughly collimates the beam. The collimated beam 34 then passes through the SWF 20.

The polarization axis of the beam is aligned to the SWF 20 so that there is no separation of orthogonal polarization vectors of the laser beam, and the beam then passes through a pair of Kerr cells 22 and 24 to lens 26, which focuses the beam to a Gaussian waist 30 within a specimen 28.

Return light, either fluorescence or reflection from the entire interaction volume (a diabolo shaped volume) within the specimen, returns through lens 26. However only light from the Gaussian waist 30 will exclusively retrace the full set of incoming ray paths through the optical system back to the SWF 20.

For imaging in reflection, a current is passed through coil 32 surrounding Kerr cell 22 so that the combined effect on Kerr Cell 22 and Kerr Cell 24 is to rotate the E vector of the polarized return light by 90° degrees relative to the outgoing light. Hence, when the return beam traverses SWF 20 it is diverged from the outgoing beam path 34 and instead it travels along beam path 36.

This returning beam is converged by lens 18 to a focus 38 which causes it to enter the core at the tip of an optic fiber 40.

The return light is carried in the core of fiber 40 to the opposite end 42, from which it is emitted and passes to photomultiplier tube (PMT) 44. The electrical output of PMT 44 in conjunction with the XY positional information from the scanning mechanism 14 is used to build up a 2D data set forming the image.

In fluorescence imaging mode the current in coil 32 is adjusted along path 36.

The materials of Kerr Cell 22 and Kerr Cell 24 are different and may be chosen so that the 2 difference in optical rotation for the two together rotates the anticipated range of fluorescent wavelengths by about the same angle on traversal whereas the rotation of the reflected excitation light is rotated by a substantially different amount.

Alternatively it may be chosen so that the rotation angle is wavelength independent. In these latter cases separation between fluorescent wavelengths (and reflection) is achieved by means of lens 46 and prism 48, and separate channels of acquisition are obtained from separate photodetectors 44 and 50.

FIG. 2 is a schematic view of the optical configuration of an endoscope head 52 according to a further preferred embodiment of the present invention. The head 52 includes first lens 54 for collimating blue laser excitatory beam 56. Collimated beam 58 passes through prism 60, and is then focused to a Gaussian waist 62 (in use, within a sample) by second lens 64.

Return light will retrace the incoming light back to prism 60, but will be refracted through a different angle owing to its different wavelength; hence prism 60 will act as a beam splitter, and the return light 64 will emerge from first lens 54 separated from incoming beam 56.

The head 52 of FIG. 2 is very simple, but the angular deflection at the prism and hence non-linear optic axis may—in some applications—be disadvantageous, as it imposes a shape for the head which may be inconvenient to use or make it difficult or impossible for the head to pass through a narrow tube.

An optical configuration of an endoscope head according to a further preferred embodiment of the present invention is shown in schematic form in FIG. 3 at 66. The head 66 includes a prism combination 68 (to give a straight through optic axis and a straight cylindrical head for the endo- or endomicroscope design) as well as first and second lenses 70 and 72. Again, return light 74 emerges from first lens 70 separated from incoming excitatory beam 76.

Prism combination 68 utilizes the same principle as an achromatic doublet except that the angles are reversed to give minimum deviation but maximum dispersion.

An optical configuration according to a further preferred embodiment of the present invention is shown in schematic form in FIG. 4 at 78. The head 78 includes a direct vision spectroscope three prism combination 80 and is comparable (though in reverse) to a Hastings achromatic triplet, to reduce or eliminate astigmatism resulting from the arrangement of FIG. 3. Prism combination 80 includes a 60° SF11 Flintglass central prism 82 cemented between two 45° BK7 prisms 84 and 86. This arrangement gives almost 0° deviation for the blue laser line and considerable overall dispersion, between incoming excitatory beam 88 and return beam 90.

FIG. 5 is a ray trace for the prism combination 80 or FIG. 4, showing central 60° SF11 Flintglass prism 82 between the pair of 45° BK7 prisms 84 and 86. Incoming beam 92 will be dispersed into an undeviated component 94, with the red deviated as shown at 96 and blue at 98. The total dispersion of this particular combination 80 is greater than would be required for a miniature endomicroscope head and prisms of much smaller angles (and shorter overall dimensions) may be suitable and, in some applications, preferable.

FIG. 6 is a schematic representation of an optical configuration 100 for an endoscope head according to a further preferred embodiment of the present invention. The configuration 100 includes a combination of plano-concave and plano-convex lenses 102 and 104, optically coupled together to give a system in which the divergence of the return beam 106 relative to the incoming excitatory beam 108 can be almost infinitely varied, but altering the position of plano-convex lens 104 within the concavity of plano-concave lens 102. This configuration 100 also includes collimating lens 110, focusing lens 112 and prism pair 114 located between plano-convex lens 104 and focusing lens 112.

The embodiments of FIGS. 2, 3, 4 and 6 have the advantage of simplicity but suffer from the drawback that the return light fluorescence, even from a single pure fluorophore, consists of a broad range of wavelengths, which does not focus to a spot but spreads into a spectral line. This makes collection by the return fiber more difficult (a line of fiber cores or a fiber bundle is required or special fiber design with elongated collection aperture means) and also reduces the isolation of the focal plane to an equivalent value for a slit scanning confocal system.

There is a way of getting around this using a prism based system in the head. The common optical glasses including the Flint glass Crown glass pair SF11 and BK7 referred to earlier are made from glass types which fall on Abbe's 'normal' glass line. On this line the partial dispersions of the glasses match in a way which allows doublet lenses to be constructed which are achromatic for the visible region 400-700 nm (a likely requirement of lenses for human use). Any pair of glasses from this line can be combined in a concave convex doublet (suitably matched) to produce an achromatic lens combination.

There are glass types available which do not follow the Abbe's 'normal' glass line, that is their partial dispersions do not match and they are said to have deviating partial dispersions (see Schott Tables). These glasses are formulated to correct the slight secondary spectrum (green-orange) which remains in achromatic doublets because the partial dispersions even of the normal line glasses never exactly match for all wavelengths. In a lens design the addition of an appropriately figured third lens of such a glass type allows the spectral curves to match at three levels and thus greatly reduces the secondary spectrum. Such lenses are known as 'apochromatic'. Apochromatic lenses have many more individual lens elements in them (up to 20 in some cases) to correct for other aberrations.

After an appraisal of the spectral deviation curves, one can choose such a glass to replace the BK7 crown prism, and combine this replacement with an SF 11 or SF 59 prism to produce a combination which is reasonably achromatic and non-deviating for the 515-650 nm range but which has substantial dispersion for the blue.

Such a prism pair will produce a good separation between the blue 488 nm excitation line and the fluorescence. The fluorescence spectrum is effectively bunched up although the graph is not entirely level but folds back (the angular deviation will actually only be exactly the same for matching pairs of wavelengths). However, this is a considerable improvement. A third glass type taken from another line on the Abbe deviation glass curve will produce even further flattening, and sets of three wavelengths will have exactly matching angular deviations.

Figure 7:
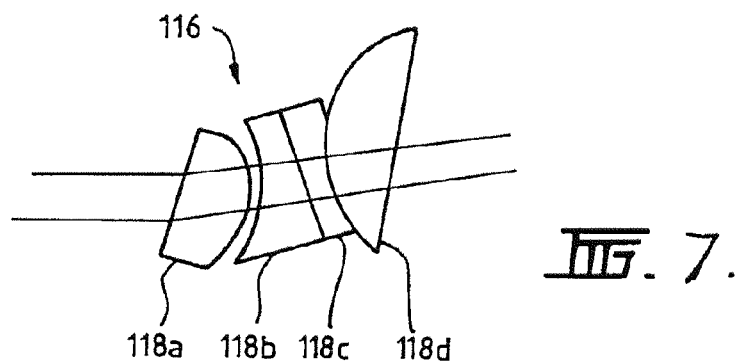
FIG. 7 is a schematic view of the optical configuration of the beam splitter of an endoscope head according to another preferred embodiment of the present invention.

A fourth prism of suitably chosen glass could be added to further correct the spectrum to four wavelengths as shown in FIG. 7 (which comprises a direct vision prism pair 116 comprising four prisms 118a,b,c,d).

Such a combination of prisms could be made from standard Schott catalogue optical glasses. Fortunately it is much easier to find standard glass types which have appropriate RI deviation in the blue than the red, but the number of prisms required could be reduced and the design made more compact by the choice of special optical materials. Such materials could include fluorite ($CaF_2$) or magnesium fluoride in combination with a second optical material that exhibits strong anomalous dispersion.

It is also possible to design an optical material for the second prism with a more strongly kinked anomalous deviation curve, which would minimize the number of prisms (possibly to just two) and their angle and hence the optical thickness. The specifications would be that the material is glassy or isotropic (cubic crystal structure), that it has an intrinsic absorbance or a dopant which absorbs in the indigo/violet part of the spectrum, shorter than 488 nm, so that the positive asymptotic limb of the anomalous dispersion curve lifts the deflection angle from the 488 nm but has the dispersion uniform and of much lower gradient for the 515-650 nm region.

The optical medium or dopant must not fluoresce or have too high an absorption at the excitation wavelength and should be free of absorption lines in the 515-650 nm fluorescence region. Suitable materials include certain organic dyes dissolved in transparent polymer or might potentially be formulated from a rare earth doped fluorozirconate ZBLAN glass.

This principle of successive corrections by a train of optical elements and the use of 'kinks' in the active parameter graphs (the relevant equivalent to anomalous dispersion in other optical properties) can be applied to a number of other novel beam splitter methods and apparatuses according to the present invention.

Figure 8:
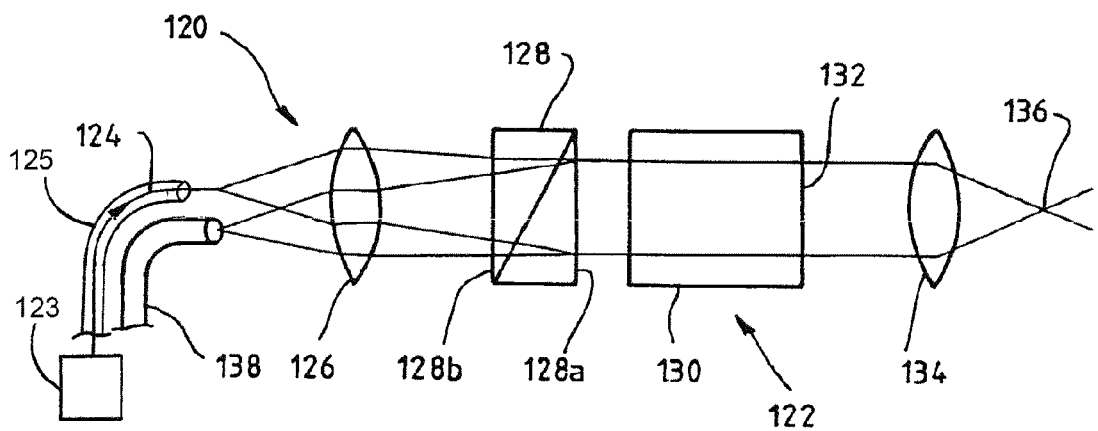
FIG. 8 is a schematic view of the optical configuration of an endoscope head according to another preferred embodiment of the present invention.

For example, FIG. 8 is a schematic view of an endoscope head 120 with a beam splitter 122 based on optical rotary dispersion in a chiral medium. This beam splitter depends on the optical rotatory dispersion of a medium containing chiral molecules or chirally oriented bonds, such as glucose or $NaClO_3$.

The explanation which follows is couched for an embodiment in which a liquid is used as the optically active medium although in practice this may require an excessive path length and a chiral crystal (such as quartz), cut with faces orthogonal to the C axis, may be preferred, as optically active (chiral) crystalline materials have a far greater rotating power than most liquids; quartz, for example, has a rotating power of 21.7° per mm whereas dextrose syrup has a rotating power of 1° per mm.

The operation of this method requires the light to be polarized in a fixed vector state as from a laser diode 123 and hence polarization maintaining fiber 125 is needed if the design is adapted to a two fiber system.

The polarized light 124 emitted from a laser diode 123 is collimated by lens 126 and passes through a prism pair in the form of SWF 128. The SWF 128 is oriented so that the eigen-vector of the light is parallel to the prism's fast (or slow) axis. This differs from Nomarski microscopy in which the polarization vector is oriented at 45□ to the fast and slow axes of prism and the beam is split 50:50. Thus, in this embodiment the light is not split into separate orthogonal polarization beams on its first traversal of the SWF 128.

The beam next passes into a tube or column 130 of dextrose syrup (d glucose), which rotates the plane of the polarization vector in a right handed spiral by a certain amount, preferably >π radians. The light beam exits the flat face 132 of the far side of the tube 130 and passes to an objective lens 134, which focuses the beam to a Gaussian waist 136 within the specimen (not shown).

Fluorescence generated at the Gaussian waist 136 is Stokes shifted but is in general predominantly of the same polarization vector state as the polarization vector of the excitation beam (as long as the relaxation time of the excited state of the fluorophore is not too long).

Some of this light and some of the excitation wavelength reflected from the region passes back through the objective lens 134 to the dextrose column 130. Reflection from most materials does not alter the polarization vector.

In traversing the column 130 in the reverse direction the polarization vector is again rotated in a right handed spiral, rotating backwards by exactly the same angle by which it was rotated forwards on its first pass. The fluorescent light is also rotated in a right handed spiral direction but, because of optical rotatory dispersion (that is, as the interaction strength between the spiral mechanical oscillators is wavelength dependent), it is rotated through a different angle to the reflected beam.

For the most efficient operation of the beam splitter 122, the difference between the optical rotatory dispersion angles of the reflected light and the fluorescence should be $\pi/2$.

After traversing the chiral medium in column 130, the light then passes back to the prism pair 128. In this embodiment, prism 128a is made of a birefringent material such as calcite, cut and polished at a suitably oriented crystal angle. The reflected return light acts as the 'ordinary' ray and is refracted by the prism 128a along exactly its initial path to its point of origin. The fluorescent return light—having its polarization vector at $\pi/2$ relative to the reflected ray—acts as the 'extraordinary' ray and is deflected by a different angle when it passes the prism 128a. This prism 128a also introduces a slight chromatic dispersion as well because the fluorescence consists of a range of wavelengths. This dispersion of the fluorescence is compensated for by the matching dispersion of the second prism 128b (the next element traversed by the returning light). The light is then focused by the lens 126 and the confocal return enters the core of the return fiber 138 and is transmitted along the fiber to a photodetector (not shown).

Note: where referred to below, the SWF is employed in a similar fashion in the following apparatuses and the description here will cover these systems as well.

This principle can operate for Argon Krypton lasers with two or more laser excitation wavelengths simultaneously traversing the dextrose column. Each wavelength will be rotated on its first traversal and after reflection, its rotation exactly reverse spiraled on return to the original source. The fluorescence from each excitation wavelength will be rotated by a different angle on return and therefore a portion of the fluorescence from each excitation wavelength be deflected at the extraordinary angle at the birefringent prism so as to enter the second fiber.

As another improved embodiment it is possible to choose a second optically active medium in the opposite enantiomorphic form which had an optical rotating dispersion curve which matched dextrose for the green, yellow and orange wavelengths but which kinks markedly for the blue, and to combine this to produce an 'achromatisation' of the fluorescence but a separation of the excitation wavelength. For example, laevulose (the laevo enantiomorphic form of glucose) produces a left handed rotation of the plane of the polarization vector of light passing through it. This opposes the rotation of the dextrose and, where the optical rotating dispersion curve of laevulose had a different gradient compared to dextrose (analogous to the refraction dispersion curves of the flint glass prism of the previous design), it is suitable for this purpose. Laevulose does not have the required kink in the graph for blue, but other substances do.

Quartz is a uniaxial crystal type and this may result in problems for certain scanning embodiments. For example if the scanning is carried out by means of a rastered movement of the blue laser chip or of the fiber tip then the beam will, for much of the time, propagate through the quartz crystal plate at a slight angle to the C axis. This will introduce birefringence into the optical path and consequent eigenvector separation which will add extra complexity and reduce optical efficiency. There are optical materials (such as sodium chlorate crystals) which are optically active, but not birefringent which would avoid this difficulty. The rotary power of this material is 3.1° per mm (for the sodium yellow lines) which is rather low for some applications. Materials with much higher optical rotatory power are detailed below.

Figure 9:
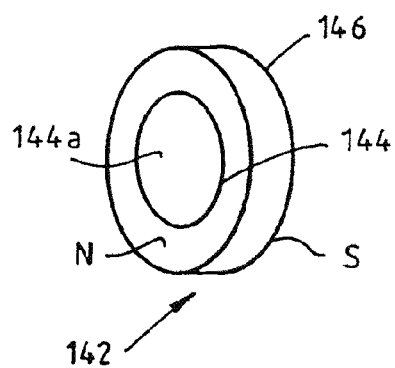
FIG. 9 is a schematic view of the Faraday effect optical rotator of an endoscope head according to another preferred embodiment of the present invention.

In another preferred embodiment of the present invention, the Faraday effect is used to provide the desired beamsplitting (that is, the rotation of the E vector of linearly polarized light as it passes through a material which simultaneously has magnetic lines of force in the same direction as the propagation direction of the light). The optical rotator of a beam splitter according to this embodiment is shown at 142 in FIG. 9. The optical rotator 142 includes a cylindrical piece of glass 144 (chosen to have a high Verdet constant) with flat polished AR coated ends 144a surrounded by a tubular cylindrical magnet 146 with north face N and south face S. The beam splitter (like those described below) is otherwise like beam splitter 122 of FIG. 8 with a birefringent prism acting as the beam separation element (but with the optical rotator replacing the column 130). As the beams of light traverses the optical rotator, the magnetic field of magnet 146 progressively rotates the E vector. Faraday rotation differs from chiral optical activity in that the reflected light undergoes further rotation of the E vector in the same direction when retraversing the glass 144. This is a non-reciprocal effect unlike chiral rotation in which the spiral retraces its original path on reflection.

This difference is important because it means that the beam splitter can be tuned to obtain maximum rotational efficiency of the reflected beam, that is 45° E vector rotation from each traversal, thus minimizing the required thickness of the glass 144. Also, as the Verdet constant is wavelength dependent the system can be switched from fluorescence to reflection.

The variation in magnetic field strength required to carry out these functions can be achieved by varying the electrical current in a wire coil wound around the glass cylinder 144 or by sliding the magnetic cylinder 146 in an axial direction so that a greater or lesser magnetic field interaction length with the active glass medium 144 can be effected. The Verdet constant is generally greater for short wavelengths and as the dependence curve shapes vary for different materials it is possible using suitable combinations to arrange a maximum rotation for the blue excitation wavelength and a compressed range of rotation for the fluorescence. This will result in the most efficient use of light.

In another preferred embodiment of the present invention, the beam splitter of the endoscope includes phase plates (or retardation elements): optical elements of a material with a physical structure that is anisotropic at a molecular or crystalline level. In classical optical terms, the spring stiffness of the mechanical oscillators in the two orthogonal polarization states is different because of the differing bond types or degree of strain within bonds in the two directions. This means that the velocity of propagation of electromagnetic vibration in the visible region differs for the two orthogonal polarization vector directions, the material is said to be birefringent, that is, having two Indices of Refraction. The two directions of the crystal plate are called the fast axis and the slow axis. (The two sets of electromagnetic propagation direction are sometimes called the ordinary and extraordinary)—o and e rays. (Note the E vector used previously stands for electric field vector).

Birefringent prisms are commonly made from uniaxial crystals (e.g. calcite) and their use to separate light beams of orthogonal polarization state has been described above.

A phase plate is effectively a 'parallel sided prism' of a birefringent material. If light impinges at right angles to the waveplate surface there is no deviation between the e and o ray, but waves with the E vector parallel to the slow axis are retarded relative to waves with the E vector parallel to the fast axis. A plane polarized wave entering the plate at an intermediate angle between the slow and the fast axes is resolved vectorially into two orthogonal polarization states which propagate at different velocities (and with different wavelengths, their frequency being constant). The two waves leave the waveplate with relative phase shift. The polarization state of the light when it leaves the wave plate is determined by the phase angle.

Anisotropy and phase shifting can also be induced and tuned in isotropic materials by straining the interatomic bonds either with a mechanically applied force, (stress induced birefringence) or by the application of a voltage between plates which produces and electrical field (the optical Kerr effect) and these principles could also be applied to a tuneable beam splitter for confocal use.

In another embodiment of the present invention, liquid crystal systems are employed to rotate light within the endoscope head optically. Liquid crystals can be optically active, birefringent, or both, so their principles of operation is covered in the two previous embodiments. The rotatory power of cholesteric liquid crystals is very large of the order of 40,000° per mm compared with ~1° per mm for corn syrup and 21.7° per mm for quartz. The major advantage of using liquid crystal systems, therefore, is the compactness possible, and their being electrical controllable and tuneable. Liquid crystal display screens use nematic liquid crystals and these are commercially available made up as electrically controllable variable phase retarders. A supertwisted nematic liquid crystal 'valve' could be used as an electrically controllable tuning device for reflection confocal microscopy. It would also have enough rotation in the power off mode to give color separation for fluorescence imaging.

In another preferred embodiment of the present invention, the intrinsic polarization properties of the reflecting object (or of the intermediate optical medium) is used to obtain optical rotation between excitatory and return light, as many biological materials exhibit birefringent properties and/or produce optical rotation.

FIG. 10 is a schematic view of the head of a confocal endoscope 150 according to a further preferred embodiment of the present invention, shown with a specimen 28. This embodiment is, in many respects, similar to that depicted in FIG. 1 and accordingly like reference numerals have been used to refer to like features. In the embodiment in FIG. 1, the miniature laser diode 12, astigmatism corrector 16 and tip of optic fiber 40 are mounted on scanning mechanism 14. This is also so in confocal endoscope 150, but beam splitter 152 is also mounted—by means of mounting arm 154 on scanning mechanism 14. Thus, in use, the beam splitter 152 is scanned (typically vibrated) with the laser 12 and tip of the optic fiber 40.

This configuration maintains the beam splitter 152 in a constant position in the optical path as the optical path is moved by scanning mechanism 14 and allows the head of confocal endoscope 150 to be particularly compact.

FIG. 11 is a schematic view of an alternative preferred beam splitter according to the present invention. In this embodiment, a miniature laser diode 160 is provided, together with mirror 162, on a single silicon substrate 164. The incident beam 166 from the laser diode 160 is reflected towards focusing lens 168. Lens 168 then focuses the beam to a Gaussian waist within a specimen (not shown).

Return light from the specimen retraces the beam path but, as the return light comprises a broader distribution of wavelengths, only a portion of the return light will be incident on mirror 162. Some of the return light will pass beside mirror 162, to be detected by a photodiode 170 located adjacent to mirror 162.

Thus, in this embodiment the beam splitter is provided by the combination of adjacent photodiode 170 and mirror 162.

Further modifications within the spirit and scope of the invention may readily be effected by person skilled in the art. It is to be understood, therefore, that this invention is not limited to the particular embodiments described by way of example hereinabove.

What is claimed is:

1. A confocal endoscope or microscope for imaging a sample, comprising:
    a light source of coherent light for illuminating the sample;
    a beam splitter for deviating the path of a beam of light by an amount dependent on one or more beam parameters selected from the group consisting of polarization and wavelength;
    a light condenser located optically between said beam splitter and said sample; and
    a light receiver for receiving returned coherent light from said light source and for forming an image of the sample thereon, (1) wherein an incident beam of coherent light from said light source is directed onto said beam splitter and hence onto said light condenser, then focussed onto said sample by said light condenser as coherent light, and (2) wherein light returning from said sample and incident on said beam splitter is deviated by said beam splitter such that said returning light has a path upon emerging from said beam splitter that diverges from a path of said incident beam immediately before impinging said beam splitter by an angle that is small relative to 90° and is then received by said light receiver, said light receiver located to receive said returning light and near said light source;
    wherein said light source and said light receiver is on a single mount and said mount is moveable for scanning said light source.

2. A confocal endoscope or microscope as claimed in claim 1, wherein said beam splitter is mounted on said mount.

3. A confocal endoscope or microscope as claimed in claim 1, wherein said mount comprises a reed.

4. A confocal endoscope or microscope as claimed in claim 1, wherein said mount is an electromagnetically vibrated reed.

5. A confocal endoscope or microscope as claimed in claim 1, including an optical head, wherein said light source is located in said optical head.

6. A confocal endoscope or microscope as claimed in claim 1, wherein said light source and said light receiver are adjacent or touching.

7. A confocal endoscope or microscope as claimed in claim 1, wherein said light source is an optical fiber tip.

8. A confocal endoscope or microscope as claimed in claim 1, wherein said beam splitter includes a plurality of optical elements selected from prisms, lenses, or both prisms and lenses.

9. A confocal endoscope or microscope as claimed in claim 8, wherein said incident beam of coherent light and light returning from said sample are parallel in a region between said beam splitter and said light condenser, and wherein said plurality of optical elements are such that a path of said returning light immediately before impinging on said light receiver has minimal net deviation relative to a path of said incident beam immediately after emission by said light source.

10. A confocal endoscope or microscope as claimed in claim 8, wherein said plurality of optical elements is arranged to focus confocal return stokes fluorescence to form a line, said line forming a spectrum in which shorter wavelength fluorescence is located towards a first end of said line closer to said light source, while longer wavelength fluorescence is located towards a second end further from said light source.

11. A confocal endoscope or microscope as claimed in claim 8, wherein said plurality of optical elements include at least one apochromatic lens.

12. A confocal endoscope or microscope as claimed in claim 8, wherein said plurality of optical elements include an SF 11 or SF 59 prism.

13. A confocal endoscope or microscope as claimed in claim 1, configured to allow light on either side of a spectral line in said returning light to be included with light from said spectral line when said returning light impinges on said light receiver.

14. A confocal endoscope or microscope as claimed in claim 13, comprising a mechanism which occludes light which is more distant in wavelength than a desired amount from said spectral line, to allow control of depth of field isolation.

15. A confocal endoscope or microscope as claimed in claim 14, including optical elements to divert chosen wavelength portions of said spectral line to one or more photodetectors to give different spectral channels for imaging.

16. A confocal endoscope or microscope as claimed in claim 15, wherein said optical elements also divert light close in wavelength to said spectral line.

17. A confocal endoscope or microscope as claimed in claim 15, including at least one optical waveguide channel to convey said returning light to said photodetectors.

18. A confocal endoscope or microscope as claimed in claim 1, including a laser and an optical waveguide to convey light from said laser to said light source.

19. A confocal endoscope or microscope as claimed in claim 1, including a return fiber and a further beam splitter, wherein said further beam splitter is located between a light exit area of said return fiber and one or more photodetectors, and is arranged to provide spectral separation after said returning light exits said fiber.

20. A confocal endoscope or microscope as claimed in claim 1, wherein said light source comprises a mirror located in the path of the returning light for directing light towards said sample, wherein said mirror has a smaller solid angle than said returning light to only partially occlude reception of said returning light by said light receiver.

21. A confocal endoscope or microscope as claimed in claim 20, wherein said mirror and said light source are provided on a single piece of silicon and said mirror comprises an etched mirror surface of the silicon.

22. A confocal endoscope or microscope as claimed in claim 1, wherein said beam splitter includes a polarization rotator and light deviator to separate light of different polarizations, and operates by optically rotating said coherent light and said returning light.

23. A confocal endoscope or microscope as claimed in claim 22, wherein said polarization rotator operates by optical rotary dispersion and includes a chiral medium to optically rotate said coherent light and said returning light.

24. A confocal endoscope or microscope as claimed in claim 22, wherein said polarization rotator includes a Faraday effect material, said Faraday effect material having simultaneously magnetic lines of force in the same direction as the propagation direction of said light, whereby the E vector of said coherent light is rotated as said coherent light passes through said material.

25. A confocal endoscope or microscope as claimed in claim 22, wherein said polarization rotator includes phase plates or retardation elements, of a material whose structure is anisotropic at a molecular or crystalline level.

26. A confocal endoscope or microscope as claimed in claim 22, wherein said polarization rotator includes liquid crystals.

27. A confocal endoscope or microscope as claimed in claim 26, wherein said liquid crystals are optically active, birefringent, or both optically active and birefringent.

28. A confocal endoscope or microscope as claimed in claim 26, wherein said liquid crystals are cholesteric liquid crystals.

29. A confocal endoscope or microscope as claimed in claim 22, wherein said optical rotation is provided by intrinsic polarization properties of the sample or of any intermediate optical medium.

30. A confocal endoscope or microscope for imaging a sample, comprising:
   a light source of coherent light for illuminating the sample;
   a beam splitter for deviating the path of a beam of light by an amount dependent on one or more beam parameters selected from the group consisting of polarization and wavelength;
   a light condenser located optically between said beam splitter and said sample; and
   a light receiver for receiving returned coherent light from said light source and for forming an image of the sample thereon, (1) wherein an incident beam of coherent light from said light source is directed onto said beam splitter and hence onto said light condenser, then focussed onto said sample by said light condenser as coherent light, and (2) wherein light returning from said sample and incident on said beam splitter is deviated by said beam splitter such that said returning light has a path upon emerging from said beam splitter that diverges from a path of said incident beam immediately before impinging said beam splitter by an angle that is small relative to 90° and is then received by said light receiver, said light receiver located to receive said returning light and near said light source;
   wherein said light source and said light receiver are on a single mount, said beam splitter includes a plurality of optical elements selected from prisms, lenses, or both prisms and lenses, and said plurality of optical elements is arranged to focus confocal return stokes fluorescence to form a line, said line forming a spectrum in which shorter wavelength fluorescence is located towards a first end of said line closer to said light source, while longer wavelength fluorescence is located towards a second end further from said light source.

31. A confocal endoscope or microscope for imaging a sample, comprising:
   a light source of coherent light for illuminating the sample;
   a beam splitter for deviating the path of a beam of light by an amount dependent on one or more beam parameters selected from the group consisting of polarization and wavelength;
   a light condenser located optically between said beam splitter and said sample; and
   a light receiver for receiving returned coherent light from said light source and for forming an image of the sample thereon, (1) wherein an incident beam of coherent light from said light source is directed onto said beam splitter and hence onto said light condenser, then focussed onto said sample by said light condenser as coherent light, and (2) wherein light returning from said sample and incident on said beam splitter is deviated by said beam splitter such that said returning light has a path upon emerging from said beam splitter that diverges from a path of said incident beam immediately before impinging said beam splitter by an angle that is small relative to 90° and is then received by said light receiver, said light receiver located to receive said returning light and near said light source;

wherein said light source and said light receiver are on a single mount, said beam splitter includes a plurality of optical elements selected from prisms, lenses, or both prisms and lenses, and said plurality of optical elements include at least one apochromatic lens.

32. A confocal endoscope or microscope for imaging a sample, comprising:

a light source of coherent light for illuminating the sample;

a beam splitter for deviating the path of a beam of light by an amount dependent on one or more beam parameters selected from the group consisting of polarization and wavelength;

a light condenser located optically between said beam splitter and said sample; and a light receiver for receiving returned coherent light from said light source and for forming an image of the sample thereon, (1) wherein an incident beam of coherent light from said light source is directed onto said beam splitter and hence onto said light condenser, then focussed onto said sample by said light condenser as coherent light, and (2) wherein light returning from said sample and incident on said beam splitter is deviated by said beam splitter such that said returning light has a path upon emerging from said beam splitter that diverges from a path of said incident beam immediately before impinging said beam splitter by an angle that is small relative to 90° and is then received by said light receiver, said light receiver located to receive said returning light and near said light source;

wherein said light source and said light receiver are on a single mount, said beam splitter includes a plurality of optical elements selected from prisms, lenses, or both prisms and lenses, and said plurality of optical elements include an SF 11 or SF 59 prism.

33. A confocal endoscope or microscope for imaging a sample, comprising:

a light source of coherent light for illuminating the sample;

a beam splitter for deviating the path of a beam of light by an amount dependent on one or more beam parameters selected from the group consisting of polarization and wavelength;

a light condenser located optically between said beam splitter and said sample; and a light receiver for receiving returned coherent light from said light source and for forming an image of the sample thereon, (1) wherein an incident beam of coherent light from said light source is directed onto said beam splitter and hence onto said light condenser, then focussed onto said sample by said light condenser as coherent light, and (2) wherein light returning from said sample and incident on said beam splitter is deviated by said beam splitter such that said returning light has a path upon emerging from said beam splitter that diverges from a path of said incident beam immediately before impinging said beam splitter by an angle that is small relative to 90° and is then received by said light receiver, said light receiver located to receive said returning light and near said light source;

wherein said light source and said light receiver are on a single mount and wherein said confocal endoscope or microscope is configured to allow light on either side of a spectral line in said returning light to be included with light from said spectral line when said returning light impinges on said light receiver.

* * * * *